Dec. 29, 1936.  M. B. WOODS  2,065,956
RIDGE BREAKER
Filed July 11, 1936
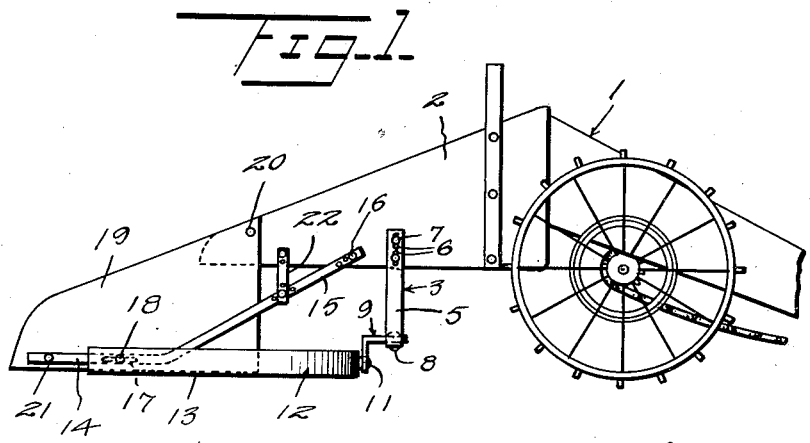
Fig. 1
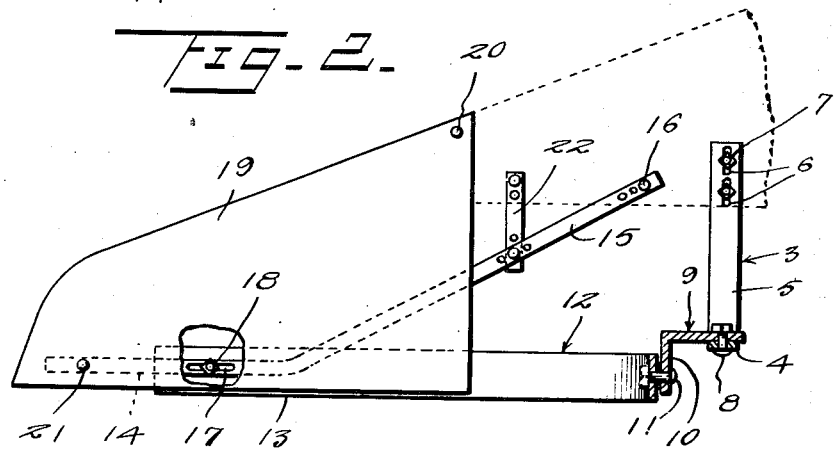
Fig. 2
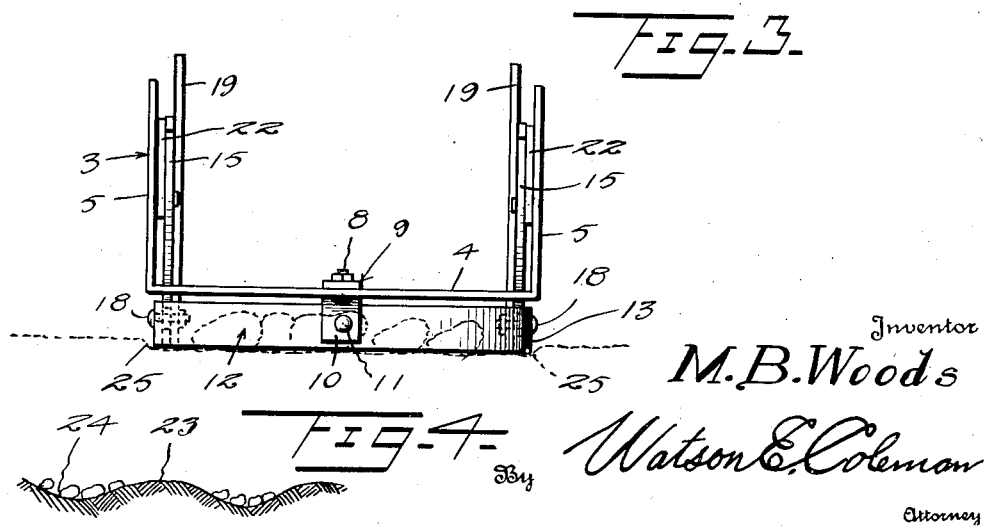
Fig. 3
Fig. 4
Inventor
M. B. Woods
By Watson E. Coleman
Attorney Patented Dec. 29, 1936

2,065,956

UNITED STATES PATENT OFFICE 2,065,956

RIDGE BREAKER

Marion B. Woods, Weiser, Idaho

Application July 11, 1936, Serial No. 90,200

4 Claims. (Cl. 55—51)

This invention relates to the class of harvesting machinery, and pertains particularly to a potato digger or harvester.

The primary object of the present invention is to provide an attachment for a potato digger which will operate to smooth or flatten out the hill or ridge of earth which is ordinarily laid down by the digger as it travels along and upon which the potatoes are deposited, so that the potatoes will be discharged from the digger onto a flat surface from which they may be eventually gathered.

Another object of the invention is to provide an attachment for potato diggers which will operate to fill in the ditches used for irrigating between the rows or hills of potatoes and the wheel tracks of the machine.

Still another object of the invention is to provide an attachment which is secured to the tailpiece of the digger and which may be raised and lowered with the same.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in side elevation of the rear portion of a conventionally illustrated potato digger showing the structure embodying the present invention attached thereto.

Fig. 2 is a view in longitudinal section, upon an enlarged scale, of the digger attachment, a portion of the same being broken away.

Fig. 3 is a view in front elevation of the attachment per se.

Fig. 4 is a view illustrating diagrammatically the form in which the earth is normally left behind a digger, with potatoes deposited on the surface.

Referring now more particularly to the drawing the numeral 1 generally designates the rear portion of a potato digger, the part from which the potatoes are discharged and which will hereinafter be referred to as the tailpiece, being indicated by the numeral 2.

The present attachment consists of a vertically arranged substantially square U-frame, indicated generally by the numeral 3 and having a horizontal central portion 4 and the vertical side portions or arms 5, the upper ends of which are provided with longitudinally extending spaced bolt slots 6 for the reception of the securing bolts 7 which are applied to or may form an original part of the tailpiece structure. The frame 3 is disposed beneath the tailpiece with the upper ends of the arms extending across the outer sides thereof or, in other words, the tailpiece is disposed between the upper end of the arms of the frame 3 so that the horizontal portion 4 is disposed in relatively close relation with the ground. At the central part of the bar 4, a bolt 8 is located which passes through one angle of the two-part angular bracket 9, the other part of the bracket being directed downwardly as indicated at 10 and carrying a horizontally disposed bolt 11.

Abutting the vertical downwardly extending portion 10 of the bracket 9 is the apex portion of a horizontally disposed scraper 12 which is in the form of a curved V, that is, the portions extending from the apex are bowed outwardly slightly so that the apex forms a nose which is forced through the earth which is discharged in the form of a hill from the shaker part of the potato digger. This scraper has its side portions 13 relatively long and extending rearwardly from the tailpiece but contacting at their lower edges with the ground, and adjacent the rear end of each arm of the scraper is attached the horizontal portion 14 of a brace arm 15 which extends upwardly and forwardly toward the adjacent side wall of the tailpiece 2, to which it is attached by means of a bolt or other securing element 16. The horizontal portion 14 of the brace has a slot 17 through which a bolt 18 passes, and this bolt in addition to securing the brace to the adjacent arm 13 of the scraper, passes through the lower part of a vertically disposed wing plate 19, to secure it also to the adjacent arm 13 of the scraper. The upper part of each wing plate 19 extends across the outer adjacent side of the tailpiece 2 to be secured thereto, as indicated at 20, and an additional securing means 21 is passed through each wing piece to fasten it to the projecting rear part of the horizontal portion 14 of the brace 15.

An additional bracing means in the form of a link 22 couples each brace arm 15 with the tailpiece 2 as illustrated, these links 22 being secured to the tailpiece and depending therefrom rearwardly of the securing element 16.

As previously stated, and as shown in Fig. 1, the scraper lies upon the surface of the earth or has its lower edge in the plane of the lower points of the digger supporting wheels. Normally a digger forms a ditch in the earth in digging up the potatoes, and as the potatoes are carried over a shaking structure to remove the earth and stones, this removed material is deposited back in the ditch so that a pile of earth forms in the center of the ditch longitudinally thereof thus leaving an earth formation of the transverse sectional design illustrated in Fig. 4. It will thus be seen that the central mound of earth which is designated 23, is flanked by the gulleys 24 and the discharged potatoes fall into these gulleys from which they must be gathered.

The device embodying the present attachment smooths down the ridge 23 so that there is thus formed behind the digger a shallow ditch having a flat bottom and the shallow side walls which are indicated by the numeral 25. The earth is thus left substantially flat after the digger has passed and there will not be formed gulleys into which rain water may flow and cut away or erode the earth surface.

As a result, also, of the flat condition in which the earth is left after the ridge breaker has passed, the potatoes will not roll into the ditches which are ordinarily formed and get crushed by the wheels of the cultivator or trampled on by the horses if the cultivator is horse-drawn.

In diggers which do not have movable tailpieces the ridge breaker may be oscillatably attached and have means associated therewith for effecting its vertical adjustment.

What is claimed, is:

1. In a potato digger having a tailpiece, an earth scraping attachment comprising an open framelike body disposed beneath the tailpiece and in contact with the earth, a supporting frame coupling the forward end of said body with the tailpiece, and connecting braces between the sides of the body and the tailpiece, said body being open at its rear.

2. In a potato digger having a tailpiece from which potatoes are discharged, a hanging U-frame having vertical portions and a horizontal portion, said tailpiece being disposed between the upper ends of the vertical portions and having said portions secured thereto, a horizontally disposed curved V-body disposed horizontally beneath the tailpiece, a connection between the apex portion of said body and the horizontal portion of the U-frame, and brace arms coupling the free ends of said body with the overlying tailpiece.

3. In a potato digger having a tailpiece from which potatoes are discharged, a hanging U-frame having vertical portions and a horizontal portion, said tailpiece being disposed between the upper ends of the vertical portions and having said portions secured thereto, a horizontally disposed curved V-body disposed horizontally beneath the tailpiece, a connection between the apex portion of said body and the horizontal portion of the U-frame, brace arms coupling the free ends of said body with the overlying tailpiece, and a pair of vertically disposed wings each secured adjacent its lower edge to a side of said body and extending upwardly therefrom across a portion of the tailpiece to which it is secured.

4. In a potato digger having a tailpiece from which potatoes are discharged, an earth leveling attachment comprising a vertically disposed frame having a horizontal lower portion and upright side portions, said side portions each being secured at its upper end to the side of the tailpiece, a bracket having two angularly related parts one of which is secured to the central part of the horizontal portion of said frame and the other part of the bracket being vertically arranged, a substantially V-shaped scraper formed of relatively wide material and horizontally disposed with an edge adapted for contact with the earth, means coupling the apex portion of said scraper with the vertical part of said bracket, the sides of said scraper being bowed outwardly and extending rearwardly from the digger, vertical wing members coupling the rear portions of the sides of the scraper with the overlying sides of the tailpiece, and bracing means between the scraper unit and the tailpiece.

MARION B. WOODS.